US010788386B2

(12) United States Patent
Ned et al.

(10) Patent No.: US 10,788,386 B2
(45) Date of Patent: Sep. 29, 2020

(54) SENSOR HEADER ASSEMBLY FOR INCREASED RELIABILITY IN HIGH-PRESSURE ENVIRONMENTS

(71) Applicant: KULITE SEMICONDUCTOR PRODUCTS, INC., Leonia, NJ (US)

(72) Inventors: Alexander A. Ned, Kinnelon, NJ (US); Scott Goodman, Wayne, NJ (US)

(73) Assignee: KULITE SEMICONDUCTOR PRODUCTS, INC., Leonia, NJ (US)

(*) Notice: Subject to any disclaimer, the term of this patent is extended or adjusted under 35 U.S.C. 154(b) by 130 days.

(21) Appl. No.: 16/205,836

(22) Filed: Nov. 30, 2018

(65) Prior Publication Data

US 2020/0173877 A1 Jun. 4, 2020

(51) Int. Cl.
*G01L 19/00* (2006.01)
*G01L 19/14* (2006.01)

(52) U.S. Cl.
CPC ...... *G01L 19/0084* (2013.01); *G01L 19/0069* (2013.01); *G01L 19/147* (2013.01)

(58) Field of Classification Search
USPC .................................................. 73/700–756
See application file for complete search history.

(56) References Cited

U.S. PATENT DOCUMENTS

| | | | | |
|---|---|---|---|---|
| 4,612,227 A | * | 9/1986 | Lam ................... | G01L 19/0038 137/557 |
| 6,091,022 A | * | 7/2000 | Bodin ................. | G01L 19/0084 174/528 |
| 2004/0135666 A1 | * | 7/2004 | Kurtz ................. | G01L 19/0645 338/42 |
| 2004/0221656 A1 | * | 11/2004 | Kurtz ................. | G01L 19/0645 73/756 |
| 2013/0327150 A1 | * | 12/2013 | Kurtz ................. | G01L 19/00 73/756 |
| 2015/0101416 A1 | * | 4/2015 | Martin ............... | G01L 19/0084 73/756 |

* cited by examiner

*Primary Examiner* — Andre J Allen
(74) *Attorney, Agent, or Firm* — Troutman Pepper Hamilton Sanders LLP; James E. Schutz; Mark Lehi Jones (57) ABSTRACT

Header construction and techniques are disclosed that utilize header layers that provide support for electrical interconnections. A sensor header assembly includes: an upper header layer having upper through holes arranged in a first configuration; a lower header layer having lower through holes arranged in a second configuration axially offset relative to the first configuration; depressions extending from the lower header layer top surface and partially through the lower header layer, each depression defining a footprint corresponding to the first configuration of the corresponding upper through holes of the upper header layer; upper header pins extending through the corresponding upper through holes and at least partially into the corresponding lower level depressions; and lower header pins extending through the corresponding lower through holes and in electrical communication with the corresponding upper header pins. The depressions form support surfaces for supporting at least the corresponding upper header pins during high-pressure operation.

20 Claims, 7 Drawing Sheets

SENSOR HEADER ASSEMBLY FOR INCREASED RELIABILITY IN HIGH-PRESSURE ENVIRONMENTS

FIELD

The disclosed technology relates to sensor device packaging and electrical interconnections suitable for extreme high-pressure operability, and in particular, to sensor header construction and techniques utilizing header layers configured to provide support for the electrical interconnections.

BACKGROUND

Figure 1:
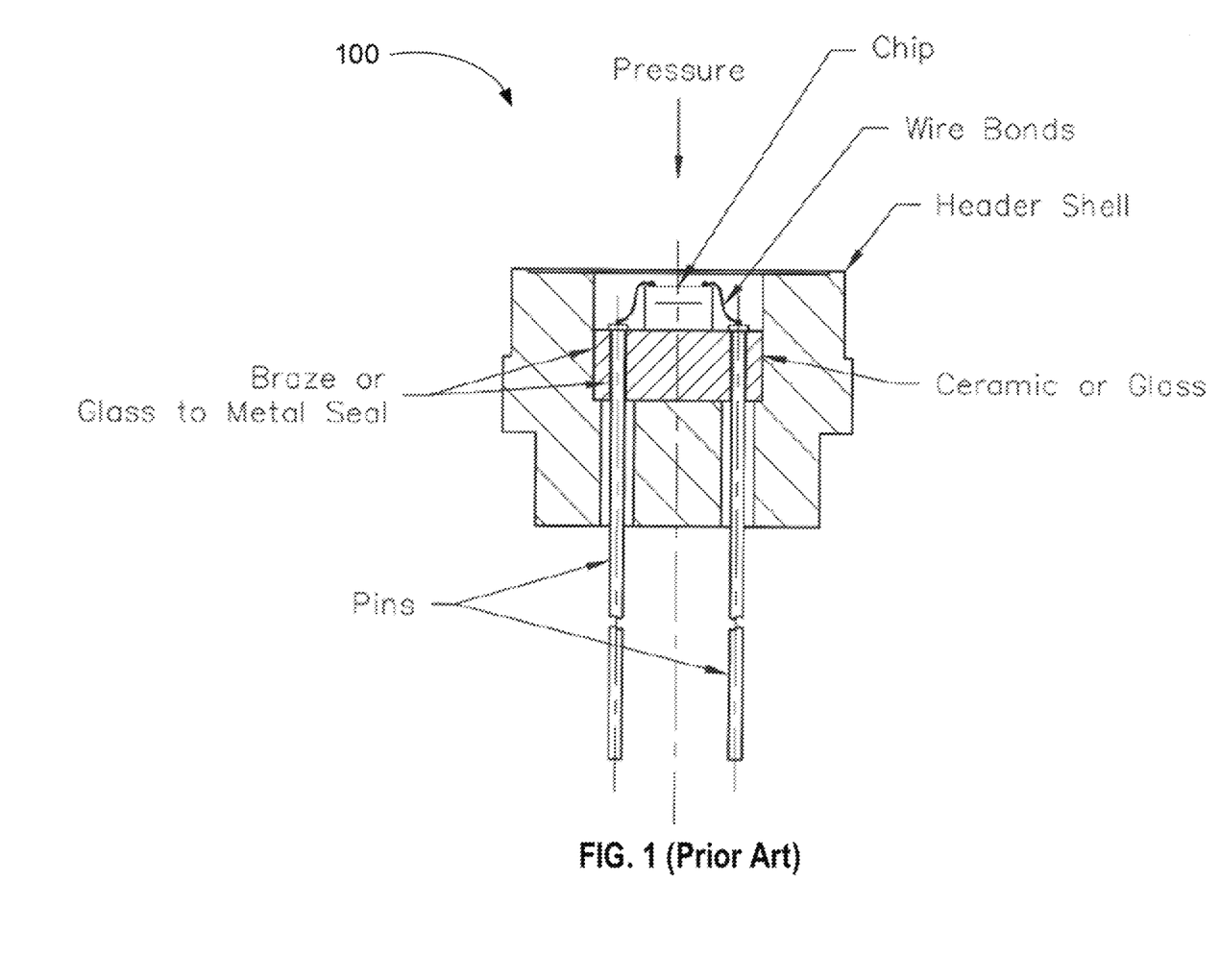
FIG. 1 depicts a cross-sectional side view of a prior art pressure sensor device 100.

Traditional high-pressure sensor headers are typically constructed utilizing glass to metal seals and/or ceramic to metal brazing to secure and seal electrical interconnection pins to a header shell. For example, FIG. 1 depicts a prior art sensor assembly having a high-pressure sensing element (chip) mounted on the header and electrically interconnected to the header pins. As pressure is applied to the sensing element, a pressure signal is generated and communicated to an external circuit, for example, via the header pins.

The materials in these traditional header designs are typically selected to withstand high pressure. However, both the glass-to-metal sealing and the brazing technologies have limitations in the pressure and/or stress levels that they can withstand. For example, when such sensor assemblies are exposed to extreme high-pressures, the header pins can dislodge, move out of place, create open circuits, etc., and decrease the reliability of the sensor. Increasing the sealing surface area or introducing tapered holes to accept the header pins for either brazing or glass-to-metal sealing can only marginally help the seals withstand higher pressures.

A need exists for sensor header systems and methods capable of reliable operation in high-pressure environments.

BRIEF SUMMARY

Certain example implementations of the disclosed technology may include a sensor header configured for reliable operation in high-pressure environments.

In one example implementation, a sensor header assembly is provided that includes: an upper header layer having two or more upper through holes arranged in a first configuration and extending through the upper header layer from a top surface to a bottom surface of the upper header layer; a lower header layer having two or more lower through holes arranged in a second configuration axially offset relative to the first configuration and extending through the lower header layer from a top surface to a bottom surface of the lower header layer; two or more depressions extending from the lower header layer top surface and partially through the lower header layer, each depression defining a footprint corresponding to the first configuration of the corresponding upper through holes of the upper header layer; two or more upper header pins extending through the corresponding two or more upper through holes and at least partially into the corresponding two or more depressions; and two or more lower header pins extending through the corresponding two or more lower through holes and in electrical communication with the corresponding two or more upper header pins. The two or more depressions form support surfaces for at least the corresponding two or more upper header pins.

In another example implementation, a method is provided that includes: forming an upper header layer including two or more upper through holes arranged in a first configuration and extending through the upper header layer from a top surface to a bottom surface of the upper header layer; forming a lower header layer including two or more lower through holes arranged in a second configuration axially offset relative to the first configuration and extending through the lower header layer from a top surface to a bottom surface of the lower header layer; defining two or more depressions extending from the lower header layer top surface and partially through the lower header layer, each depression comprising a footprint corresponding to the first configuration of the corresponding upper through holes of the upper header layer; inserting two or more upper header pins through the corresponding two or more upper through holes and at least partially into the corresponding two or more depressions, wherein the two or more depressions form support surfaces for at least the corresponding two or more upper header pins; sealing the two or more upper header pins to the corresponding two or more upper through holes; inserting two or more lower header pins through the corresponding two or more lower through holes; sealing the two or more lower header pins to the corresponding two or more lower through holes; and electrically connecting the two or more upper header pins with the corresponding two or more lower header pins.

In another example implementation, a sensor assembly is provided that includes: a header assembly; a header shell surrounding and sealed to at least a portion of the header assembly; and a sensor chip. The header assembly includes: an upper header layer having two or more upper through holes arranged in a first configuration and extending through the upper header layer from a top surface to a bottom surface of the upper header layer; a lower header layer having two or more lower through holes arranged in a second configuration axially offset relative to the first configuration and extending through the lower header layer from a top surface to a bottom surface of the lower header layer; two or more depressions extending from the lower header layer top surface and partially through the lower header layer, each depression defining a footprint corresponding to the first configuration of the corresponding upper through holes of the upper header layer; two or more upper header pins extending through the corresponding two or more upper through holes and at least partially into the corresponding two or more depressions; and two or more lower header pins extending through the corresponding two or more lower through holes and in electrical communication with the corresponding two or more upper header pins. The two or more depressions form support surfaces for at least the corresponding two or more upper header pins. The sensor device is configured for increased reliability when used in high-pressure environments.

Other implementations, features, and aspects of the disclosed technology are described in detail herein and are considered a part of the claimed disclosed technology. Other implementations, features, and aspects can be understood with reference to the following detailed description, accompanying drawings, and claims.

DETAILED DESCRIPTION

The disclosed technology includes devices and techniques for providing electronic device packaging and interconnections suitable for ultra-high-pressure operability. Certain example implementations of the disclosed technology may utilize two or more ceramic layers, each having through holes configured to accept respective header pins. In an example implementation, at least one of the ceramic layers includes through holes that are axially offset from corresponding through holes of an adjacent ceramic layer, such that a base is defined for supporting one or more header pins. As will be explained below, the disclosed technology provides a header structure that can improve a pressure sensor reliability, particularly when operating in extreme high-pressure environments.

FIG. 1 depicts a prior art sensor assembly having a high-pressure sensing element (chip) mounted on the header and electrically interconnected to substantially straight header pins. Certain aspects of the technology disclosed herein may provide pressure handling improvements over such prior art designs and will be explained below with reference to FIG. 2 through FIG. 7.

Figure 2:
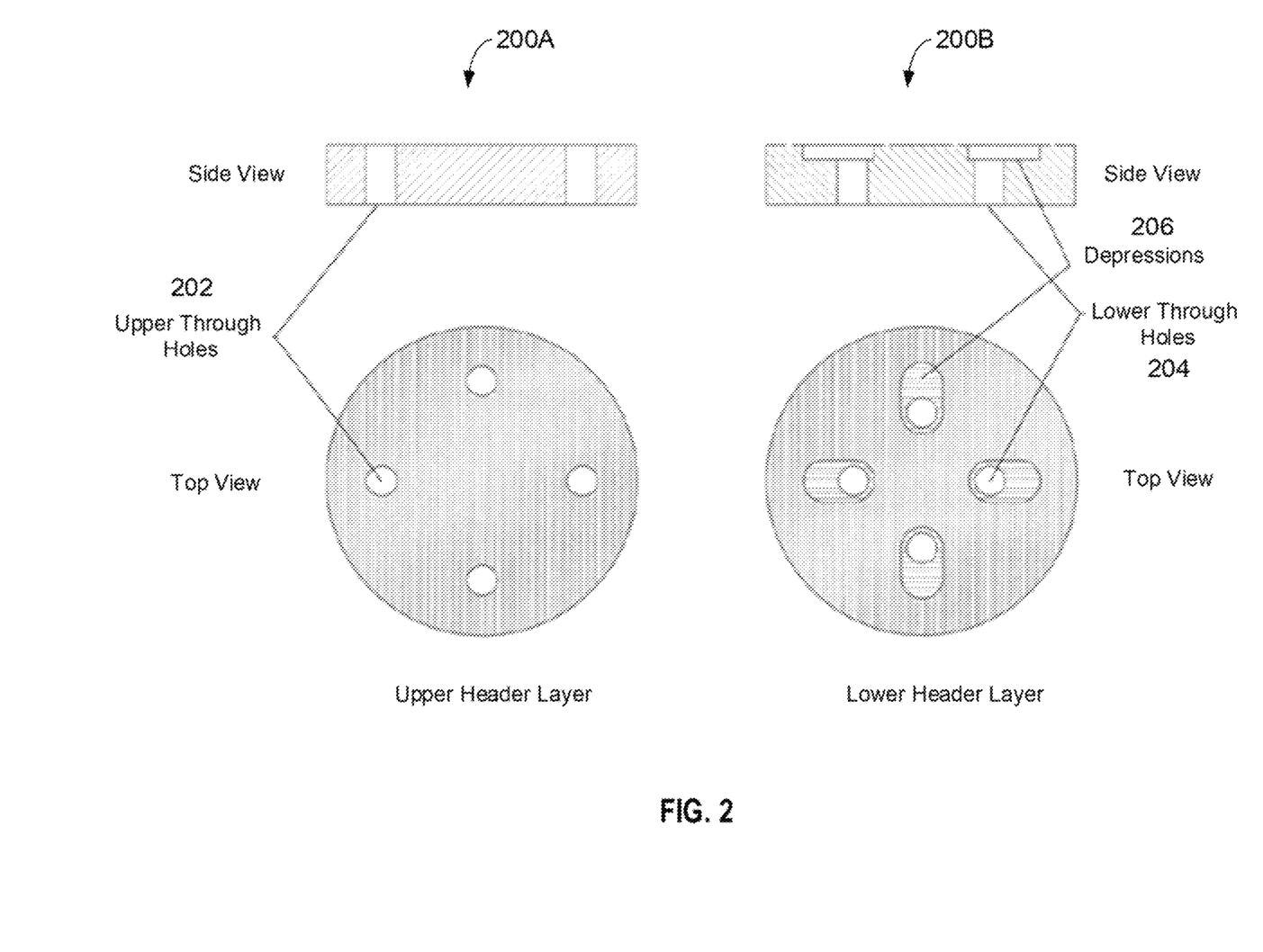
FIG. 2 depicts example cross-sectional side views and top views of an upper ceramic layer 200A and a lower ceramic layer 200B, according to an example implementation of the disclosed technology.

FIG. 2 depicts example cross-sectional side views and top views of an upper (or front) ceramic layer 200A and a lower ceramic layer 200B, according to an example implementation of the disclosed technology. As shown on the left half of FIG. 2, the upper ceramic layer 200A may include through holes 202 disposed in a first configuration. As shown on the right half of FIG. 2, the lower ceramic layer 200B may include through holes 204 disposed in a second configuration, for example, having an offset relative to the through holes 202 of the upper ceramic layer 200A.

According to an example implementation of the disclosed technology, and as depicted in FIG. 2, the lower ceramic layer 200B may include depressions 206, for example, surrounding the through holes 204, and extending only partially through the thickness of the lower ceramic layer 200B. The depressions 206 may have a footprint larger than the diameter of the through holes 204 such that a support shelf is defined adjacent to the through holes 204 of the lower ceramic layer 200B and aligned with the through holes 202 of the upper ceramic layer 200A. In certain example implementations, the upper ceramic layer 200A may be fabricated independently of the lower ceramic layer 200B.

Figure 3:
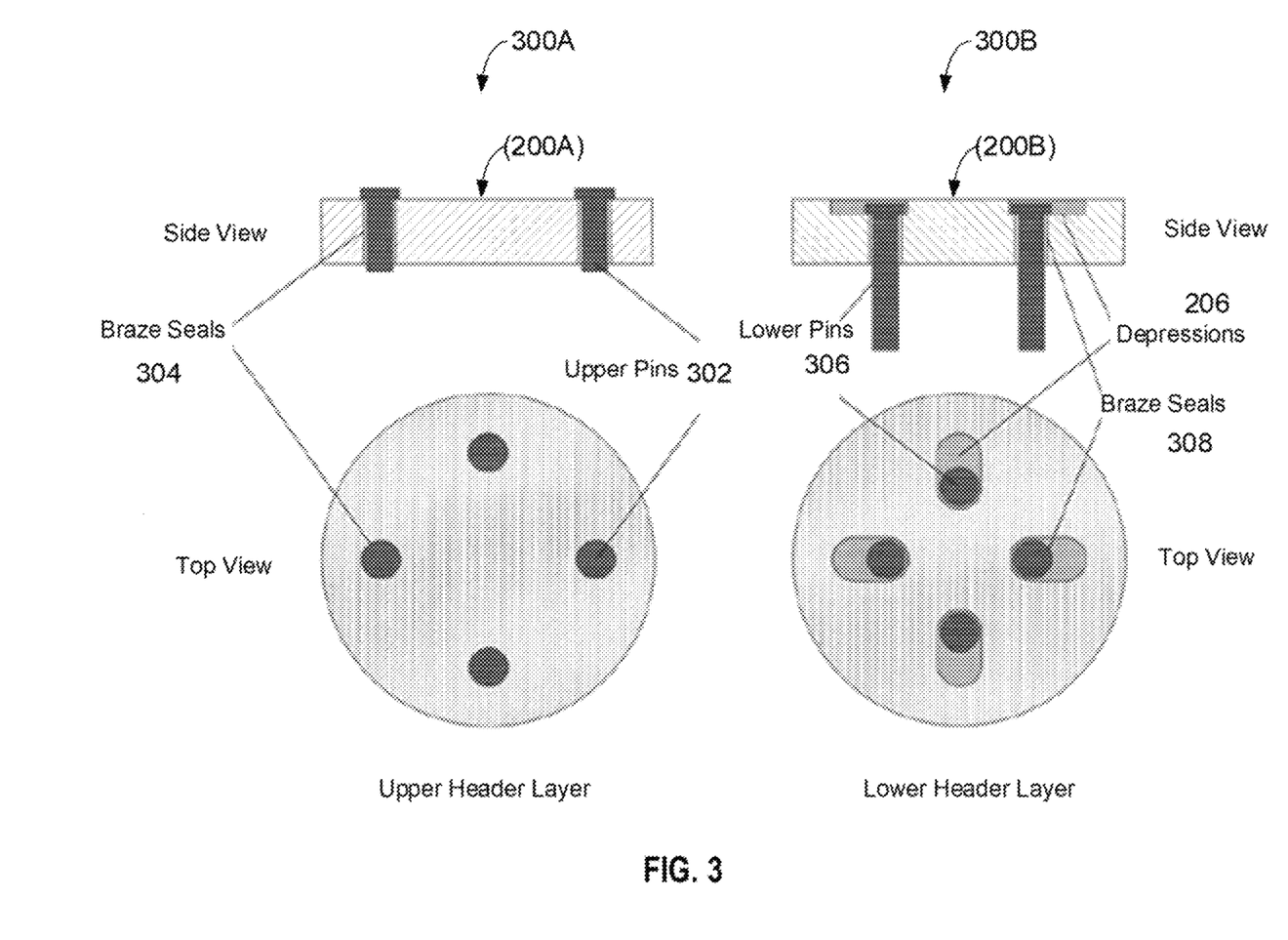
FIG. 3 depicts example cross-sectional side views and top views of an upper ceramic layer 200A and a lower ceramic layer 200B, as shown in FIG. 2, with upper pins 302 and lower pins 306 inserted into the associated through holes, according to an example implementation of the disclosed technology.

FIG. 3 depicts example cross-sectional side views and top views of an upper ceramic layer 200A and a lower ceramic layer 200B, as shown in FIG. 2, with upper pins 302 and lower pins 306 inserted into the associated through holes. In an example implementation, the upper pins 302 may be sealed to the through holes of the upper ceramic layer 200A by a braze seal 304. In an example implementation, the upper pins 302 may protrude through the thickness of the upper ceramic layer 200A and into at least a portion of the corresponding depressions 206 of the lower ceramic layer 200B for making electrical connection with the lower pins 306 (as will be discussed below in FIG. 4). In an example implementation, the lower pins 306 may be sealed to the through holes of the lower ceramic layer 200B by a braze seal 308.

In certain example implementations, the upper pins 302 may be braze sealed 304 to the through holes of the upper ceramic layer 200A to produce an upper ceramic layer sub assembly 300A. Similarly, the lower pins 306 may be braze sealed 308 to the through holes of the lower ceramic layer 200B to produce a lower ceramic layer sub assembly 300B. In certain example implementations, the upper ceramic layer sub assembly 300A may be fabricated independently of the lower ceramic layer sub assembly 300B.

Figure 4:
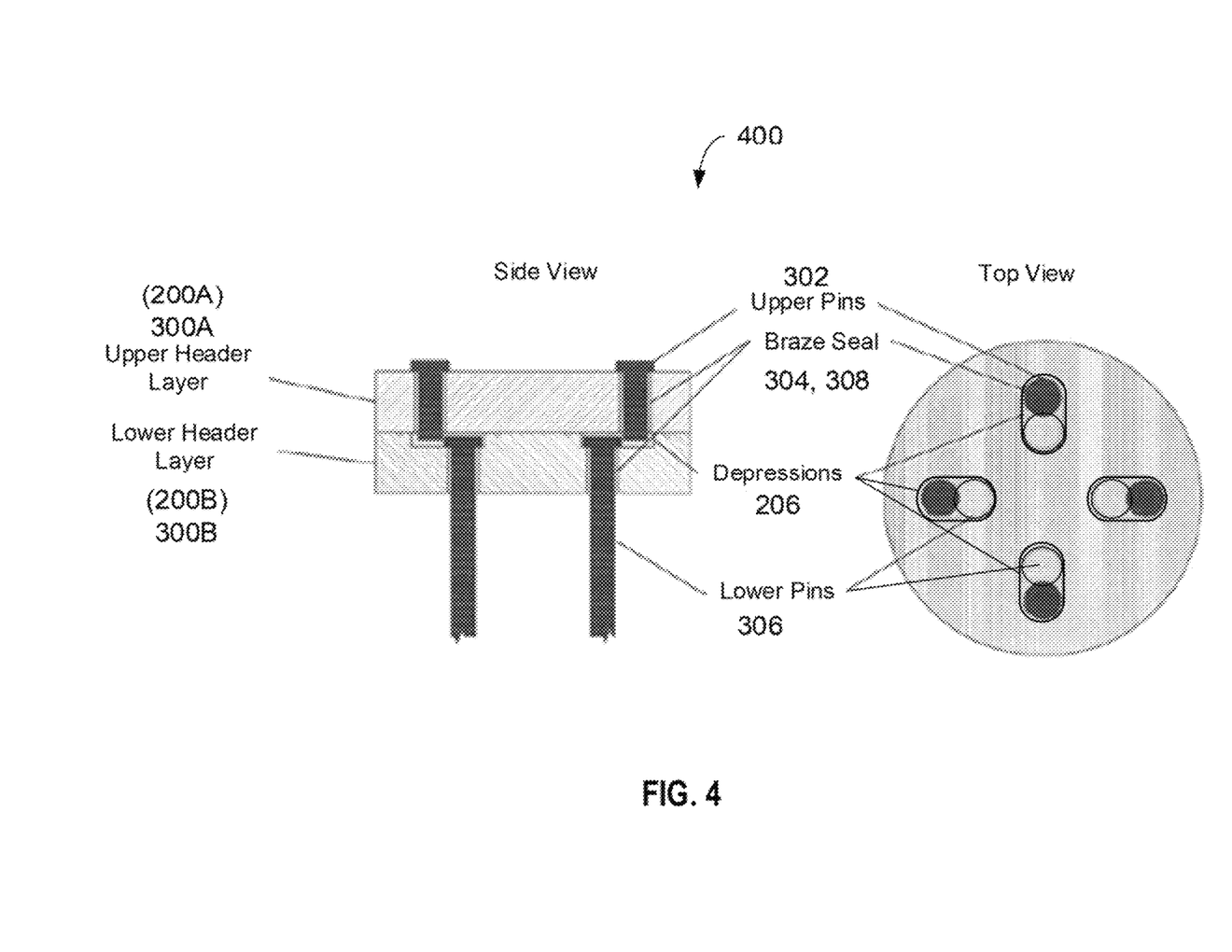
FIG. 4 depicts an example cross-sectional side view and top view of a layered assembly 400 in which the upper ceramic layer sub assembly 300A is stacked on the lower ceramic layer sub assembly 300B with upper pins 302 offset from the lower pins 306 and supported by at least a portion of the lower ceramic layer 200B.

FIG. 4 depicts an example cross-sectional side view (left) and top view (right) of a layered assembly 400 in which the upper ceramic layer sub assembly 300A may be stacked on the lower ceramic layer sub assembly 300B with upper pins 302 axially offset from the lower pins 306. In accordance with certain example implementations of the disclosed technology, the upper pins 302 may be designed to be axially (or laterally) offset with respect to the lower pins 306 when the upper ceramic layer sub assembly 300A is stacked on the lower ceramic layer sub assembly 300B. As will be explained below with reference to FIG. 5, vias may be utilized within the depressions 206, for example, so that when the ceramic layers are assembled the pins for one ceramic layer terminate next to and are electrically connected with the corresponding pins of the next adjacent ceramic layer.

Figure 5:
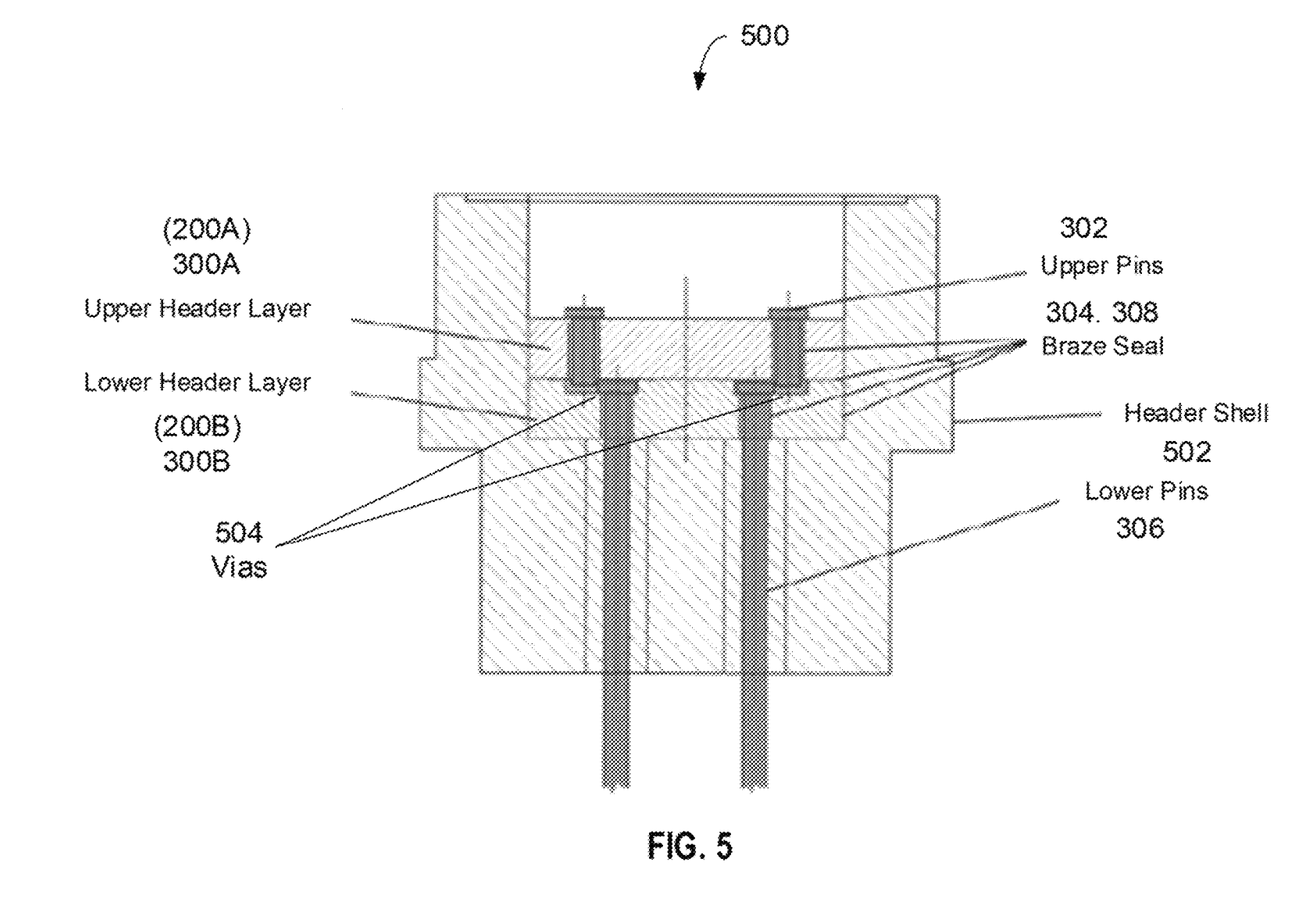
FIG. 5 depicts an example cross-sectional side view of a sensor housing assembly 500 including a header shell 502 according to an example implementation of the disclosed technology, in which the upper ceramic layer sub assembly 300A is stacked on the lower ceramic layer sub assembly 300B with upper pins 302 offset from and in electrical communication with the lower pins 306.

FIG. 5 depicts an example cross-sectional side view of a sensor housing assembly 500 including a header shell 502, according to an example implementation of the disclosed technology. In certain example implementations, vias 504 (such as metalized interconnecting channels) may be utilized to join and electrically connect the upper pins 302 and the lower pins 306. In certain example implementations, the vias 504 may be disposed within the depression area (for example, in the depressions 206 as shown in FIGS. 2-4). In accordance with certain example implementations of the disclosed technology, at least a portion of the upper pins 302 may be supported by at least a portion of the vias 504 and/or the lower ceramic layer 200B corresponding to the area of the depressions 206.

In accordance with certain example implementations of the disclosed technology, the joining surface of the two ceramic layers 200A and 200B may be fabricated in such a way so that metalized vias 504 physically interlock and electrically connect the pins from one ceramic to the next. This approach enables the upper pins 302, which may be exposed to the pressure media, to be supported by both the braze seals 304 and 308 as well as the underlying ceramic layer (i.e., the lower ceramic layer 200B). In certain example implementations, the lower pins 306 protruding from the lower ceramic layer 200B may be at least partially isolated from high-pressure exposure, which may be transferred through the upper pins 302 and terminated/supported by a portion of the lower ceramic layer 200B. This approach may further enable fabrication of ultra-high-pressure headers using traditional materials without experiencing the electrical/mechanical pin failure associated with traditional sealing technologies.

Figure 6:
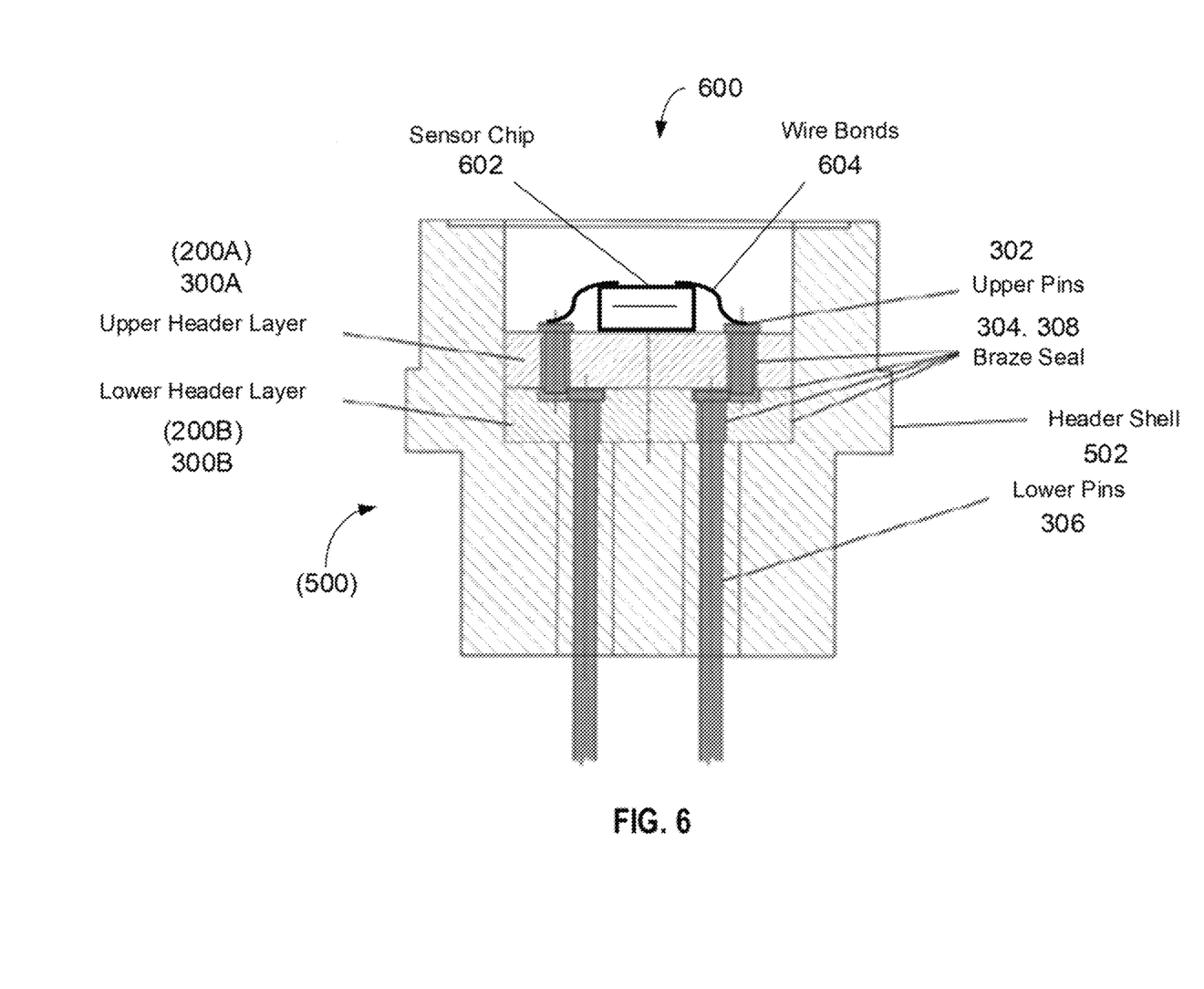
FIG. 6 depicts an example cross-sectional side view of a sensor assembly 600 (including the sensor housing assembly 500 as shown in FIG. 5) and an installed sensor chip 602.

FIG. 6 depicts an example cross-sectional side view of a sensor assembly 600 (including the sensor housing assembly 500 as shown in FIG. 5) with an installed sensor chip 602 electrically connected to the upper pins 302 by wire bonds 604. In accordance with certain example implementations of the disclosed technology, a similar approach as discussed above with respect to FIGS. 2-5 may be utilized to house a sensor chip having contact electrodes configured to interconnect directly with the upper pins 302 (not shown) without the wire bonds 604.

Figure 7:
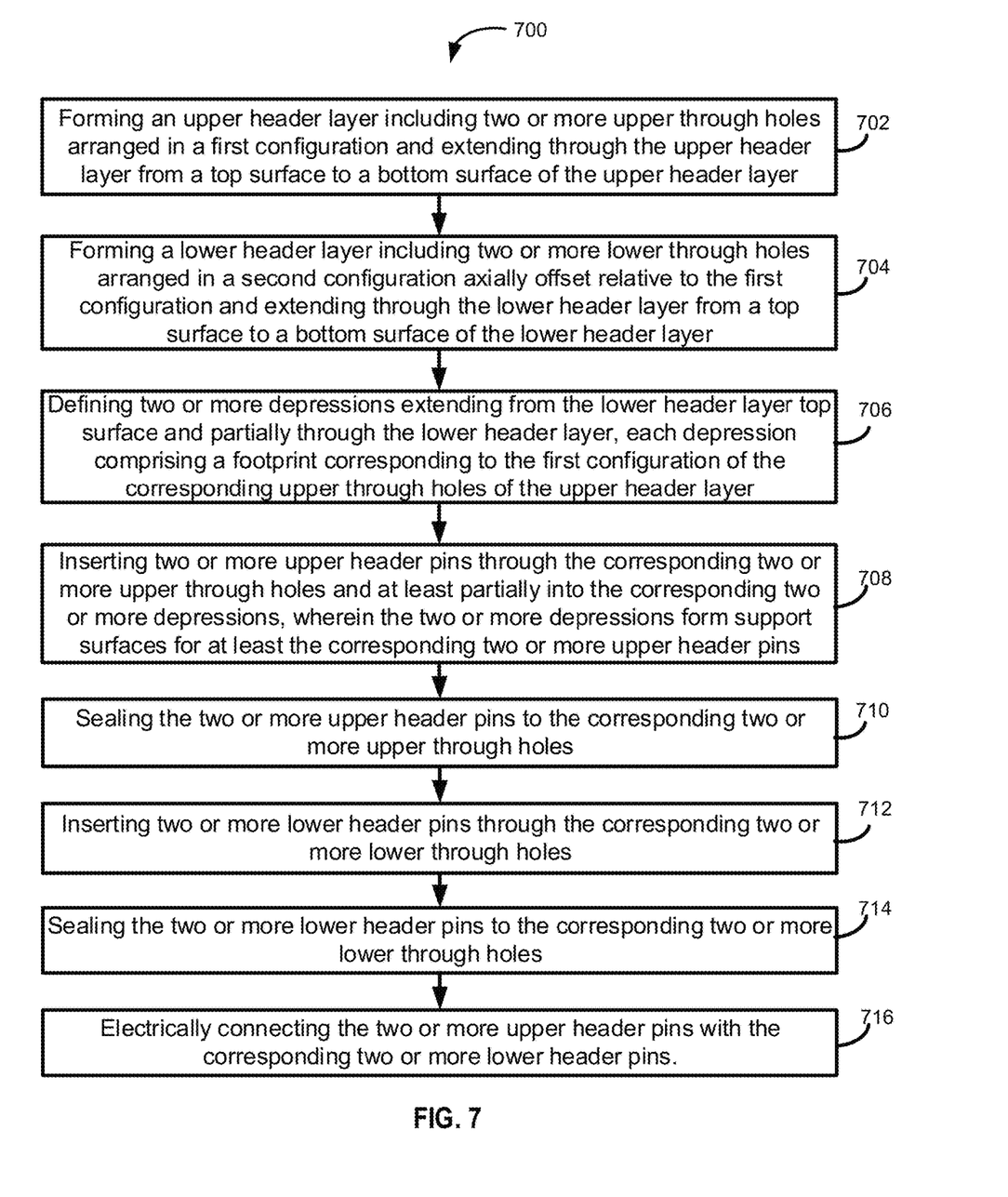
FIG. 7 is a flow diagram of an assembly method 700, according to an example implementation of the disclosed technology.

FIG. 7 is a flow diagram of an assembly method 700, according to an example implementation of the disclosed technology. In block 702, the method 700 includes forming an upper header layer including two or more upper through holes arranged in a first configuration and extending through the upper header layer from a top surface to a bottom surface of the upper header layer. In block 704, the method 700 includes forming a lower header layer including two or more lower through holes arranged in a second configuration axially offset relative to the first configuration and extending through the lower header layer from a top surface to a bottom surface of the lower header layer. In block 706, the method 700 includes defining two or more depressions extending from the lower header layer top surface and partially through the lower header layer, each depression comprising a footprint corresponding to the first configuration of the corresponding upper through holes of the upper header layer. In block 708, the method 700 includes inserting two or more upper header pins through the corresponding two or more upper through holes and at least partially into the corresponding two or more depressions, wherein the two or more depressions form support surfaces for at least the corresponding two or more upper header pins. In block 710, the method 700 includes sealing the two or more upper header pins to the corresponding two or more upper through holes. In block 712, the method 700 includes inserting two or more lower header pins through the corresponding two or more lower through holes. In block 714, the method 700 sealing the two or more lower header pins to the corresponding two or more lower through holes. In block 716, the method 700 includes electrically connecting the two or more upper header pins with the corresponding two or more lower header pins.

In certain example implementations, electrically connecting the two or more upper header pins with the corresponding two or more lower header pins includes disposing two or more electrically conductive vias in the corresponding two or more depressions.

Certain example implementations of the disclosed technology can further include mounting a sensor chip to the top surface of the upper header layer, wherein the sensor chip comprises one or more sensor contact pads. Certain example implementations of the disclosed technology include attaching a first end of one or more wire bond interconnections to the respective one or more sensor contact pads. Certain example implementations of the disclosed technology include attaching a second end of the one or more wire bond interconnections to the respective one or more of the upper pins. Certain example implementations of the disclosed technology can include sealing a header shell to at least a portion of the upper header layer.

According to an example implementation of the disclosed technology, a sensor header assembly is provided that includes: an upper header layer having two or more upper through holes arranged in a first configuration and extending through the upper header layer from a top surface to a bottom surface of the upper header layer; a lower header layer having two or more lower through holes arranged in a second configuration axially offset relative to the first configuration and extending through the lower header layer from a top surface to a bottom surface of the lower header layer; two or more depressions extending from the lower header layer top surface and partially through the lower header layer, each depression defining a footprint corresponding to the first configuration of the corresponding upper through holes of the upper header layer; two or more upper header pins extending through the corresponding two or more upper through holes and at least partially into the corresponding two or more depressions; and two or more lower header pins extending through the corresponding two or more lower through holes and in electrical communication with the corresponding two or more upper header pins. The two or more depressions form support surfaces for at least the corresponding two or more upper header pins.

Certain example implementations of the disclosed technology can include two or more electrically conductive vias disposed in the corresponding two or more depressions and configured to electrically couple the two or more upper header pins with the corresponding two or more lower header pins.

In certain implementations, the upper and lower header layers comprise a ceramic material.

In certain example implementations, the upper header pins are braze sealed to at least a portion of the corresponding upper through holes, and the lower header pins are braze sealed to at least a portion of the corresponding lower through holes.

In certain example implementations, the upper header pins include heads having a diameter larger than the diameter of the upper through holes.

In certain example implementations, at least a top portion of the upper header pins are configured as connection pads for electrical connection to at least one component.

Certain example implementations of the disclosed technology can include one or more wire bond interconnections electrically connecting the connection pads with the at least one component.

In certain example implementations, the lower header pins have heads with a diameter larger than a diameter of the lower through holes.

In accordance with certain example implementations of the disclosed technology, the depressions can include a footprint around the lower through holes having a diameter greater than a diameter of the lower pin heads and a depth such that a top portion of the lower pin heads do not extend above the top surface of the lower header layer.

Certain example implementations of the disclosed technology can include a header shell sealed to at least a portion of the upper header layer, the lower header layer, and the lower pins.

Certain example implementations described herein may be utilized to address the need for enhancing the reliability of sensor devices, particularly for use in high-pressure environments. Certain example implementations provide one or more structures support header pins for increased stability under high-pressure environments. Furthermore, in certain example implementations, the disclosed technology may further prevent or reduce degradation of the associated enclosed internal sensor components.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The term "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way but may also be configured in ways that are not listed.

As disclosed herein, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Although this disclosure describes specific examples, embodiments, and the like, certain modifications and changes may be made without departing from the scope of the disclosed technology, as set forth in the claims below. For example, although the example methods, devices, and systems, described herein are in conjunction with a pressure transducer or a sensor, the skilled artisan will readily recognize that the example methods, devices or systems may be used in other methods, devices or systems and may be configured to correspond to such other example methods, devices or systems as needed. Further, while at least one example, embodiment, or the like has been presented in the detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments or examples are not intended to be construed as a critical, required, or essential feature or element of any or all of the claims.

What is claimed is:

1. A header assembly, comprising:
   an upper header layer including:
      two or more upper through holes arranged in a first configuration and extending through the upper header layer from a top surface to a bottom surface of the upper header layer;
   a lower header layer including:
      two or more lower through holes arranged in a second configuration axially offset relative to the first configuration and extending through the lower header layer from a top surface to a bottom surface of the lower header layer;
      two or more depressions extending from the lower header layer top surface and partially through the lower header layer, each depression defining a footprint corresponding to the first configuration of the corresponding upper through holes of the upper header layer;
   two or more upper header pins extending through the corresponding two or more upper through holes and at least partially into the corresponding two or more depressions; and
   two or more lower header pins extending through the corresponding two or more lower through holes and in electrical communication with the corresponding two or more upper header pins;
   wherein the two or more depressions form support surfaces for at least the corresponding two or more upper header pins.

2. The header assembly of claim 1, further comprising two or more electrically conductive vias disposed in the corresponding two or more depressions and configured to electrically couple the two or more upper header pins with the corresponding two or more lower header pins.

3. The header assembly of claim 1, wherein the upper and lower header layers comprise a ceramic material.

4. The header assembly of claim 1, wherein the upper header pins are braze sealed to at least a portion of the corresponding upper through holes, and wherein the lower header pins are braze sealed to at least a portion of the corresponding lower through holes.

5. The header assembly of claim 1, wherein the upper header pins comprise heads having a diameter larger than the diameter of the upper through holes.

6. The header assembly of claim 1, wherein at least a top portion of the upper header pins are configured as connection pads for electrical connection to at least one component.

7. The header assembly of claim 6, further comprising one or more wire bond interconnections electrically connecting the connection pads with the at least one component.

8. The header assembly of claim 1, wherein the lower header pins comprise heads having a diameter larger than a diameter of the lower through holes.

9. The header assembly of claim 8, wherein the depressions comprise a footprint around the lower through holes having a diameter greater than a diameter of the lower pin heads and a depth such that a top portion of the lower pin heads do not extend above the top surface of the lower header layer.

10. The header assembly of claim 1, further comprising a header shell sealed to at least a portion of the upper header layer, the lower header layer, and the lower pins.

11. A method, comprising:
forming an upper header layer including two or more upper through holes arranged in a first configuration and extending through the upper header layer from a top surface to a bottom surface of the upper header layer;
forming a lower header layer including two or more lower through holes arranged in a second configuration axially offset relative to the first configuration and extending through the lower header layer from a top surface to a bottom surface of the lower header layer;
defining two or more depressions extending from the lower header layer top surface and partially through the lower header layer, each depression comprising a footprint corresponding to the first configuration of the corresponding upper through holes of the upper header layer;
inserting two or more upper header pins through the corresponding two or more upper through holes and at least partially into the corresponding two or more depressions, wherein the two or more depressions form support surfaces for at least the corresponding two or more upper header pins;
sealing the two or more upper header pins to the corresponding two or more upper through holes;
inserting two or more lower header pins through the corresponding two or more lower through holes;
sealing the two or more lower header pins to the corresponding two or more lower through holes; and
electrically connecting the two or more upper header pins with the corresponding two or more lower header pins.

12. The method of claim 11, wherein electrically connecting the two or more upper header pins with the corresponding two or more lower header pins comprises disposing two or more electrically conductive vias in the corresponding two or more depressions.

13. The method of claim 11, further comprising:
mounting a sensor chip to the top surface of the upper header layer, wherein the sensor chip comprises one or more sensor contact pads;
attaching a first end of one or more wire bond interconnections to the respective one or more sensor contact pads; and
attaching a second end of the one or more wire bond interconnections to the respective one or more of the upper pins.

14. The method of claim 11, further comprising sealing a header shell to at least a portion of the upper header layer.

15. A sensor assembly, comprising:
a header assembly
a header shell surrounding and sealed to at least a portion of the header assembly; and
a sensor chip;
wherein the header assembly, comprising:
an upper header layer including:
two or more upper through holes arranged in a first configuration and extending through the upper header layer from a top surface to a bottom surface of the upper header layer;
a lower header layer including:
two or more lower through holes arranged in a second configuration axially offset relative to the first configuration and extending through the lower header layer from a top surface to a bottom surface of the lower header layer;
two or more depressions extending from the lower header layer top surface and partially through the lower header layer, each depression defining a footprint corresponding to the first configuration of the corresponding upper through holes of the upper header layer;
two or more upper header pins extending through the corresponding two or more upper through holes and at least partially into the corresponding two or more depressions;
two or more lower header pins extending through the corresponding two or more lower through holes and in electrical communication with the corresponding two or more upper header pins;
wherein the two or more depressions form a support surfaces for at least the corresponding two or more upper header pins; and
wherein the sensor chip is mounted to the top surface of the upper header layer and is in electrical communication with the two or more upper header pins.

16. The sensor assembly of claim 15, further comprising two or more electrically conductive vias disposed in the corresponding two or more depressions and configured to electrically couple the two or more upper header pins with the corresponding two or more lower header pins.

17. The sensor assembly of claim 15, wherein the upper and lower header layers comprise a ceramic material.

18. The sensor assembly of claim 15, wherein the upper header pins are braze sealed to at least a portion of the corresponding upper through holes, and wherein the lower header pins are braze sealed to at least a portion of the corresponding lower through holes.

19. The sensor assembly of claim 15, wherein the upper header pins comprise heads having a diameter larger than the diameter of the upper through holes, and wherein the lower header pins comprise heads having a diameter larger than a diameter of the lower through holes.

20. The sensor assembly of claim 19, wherein the depressions comprise a footprint around the lower through holes having a diameter greater than a diameter of the lower pin heads and a depth such that a top portion of the lower pin heads do not extend above the top surface of the lower header layer.

* * * * *